March 5, 1968 — P. J. FELLNER ET AL — 3,372,079
AUTOMATIC LABEL APPLYING MACHINE
Filed Feb. 23, 1966 — 8 Sheets-Sheet 1

INVENTORS
PHILLIP J. FELLNER
EDWARD S. MICKIEWICZ

March 5, 1968  P. J. FELLNER ET AL  3,372,079
AUTOMATIC LABEL APPLYING MACHINE
Filed Feb. 23, 1966  8 Sheets-Sheet 2

FIG.2

INVENTORS
PHILLIP J. FELLNER
EDWARD S. MICKIEWITZ

FIG. 3

INVENTORS
PHILLIP J. FELLNER
EDWARD S. MICKIEWICZ

FIG. 4

INVENTORS
PHILLIP J. FELLNER
EDWARD S. MICKIEWICZ

FIG. 6

March 5, 1968   P. J. FELLNER ET AL   3,372,079
AUTOMATIC LABEL APPLYING MACHINE
Filed Feb. 23, 1966   8 Sheets-Sheet 6

INVENTORS
PHILLIP J. FELLNER
EDWARD S. MICKIEWICZ

INVENTORS
PHILLIP J. FELLNER
EDWARD S. MICKIEWICZ

United States Patent Office 3,372,079
Patented Mar. 5, 1968

3,372,079
AUTOMATIC LABEL APPLYING MACHINE
Phillip J. Fellner and Edward S. Mickiewicz, Racine, Wis., assignors to Sturtevant Industries, Inc.
Continuation-in-part of application Ser. No. 451,397, Apr. 28, 1965. This application Feb. 23, 1966, Ser. No. 538,131
10 Claims. (Cl. 156—360)

ABSTRACT OF THE DISCLOSURE

Automatic scale and label printing and applying machine for weighing and printing labels for prewrapped packages including a roller conveyor for the scale for permitting packages to move freely on the scale, come to a stop thereon for accurate weighing, and then be moved, off the scale, all without sticking or undesired hesitation of the package on the scale, and without causing malfunction of the scale. The movement of the package onto the scale, its stopping for weighing, and its movement off the scale are all timed with the other functioning of the automatic machine such as stopping the appropriate package at the label applying station and subsequently removing it from said station.

---

This invention relates to the automatic application of printed labels to prewrapped packages and more specifically to an apparatus for removing the label from the printing apparatus or device and affixing the label to the package. This application is a continuation in part of our co-pending application 451,397, filed Apr. 28, 1965, now abandoned.

The semi-automatic and automatic wrapping of packages in chain stores and supermarkets has become standard practice. The development of these semi-automatic and automatic machines has also produced a need for weighing and printing systems for supplying labels for the prewrapped packages. The biggest problem in the development of these systems has been the application of the label onto the package. This is generally done by manually holding the package against the label as it is ejected from the printing machine.

The increased use of soft film or Pliofilm materials for wrapping packages has also caused a problem in moving packages over flat surfaces. The Pliofilm has a tendency to stick to the top of the scale making it difficult to move the package.

The primary object of the present invention is to provide a device for automatically applying a printed label to a prewrapped package.

A further object of the present invention is to provide a device that operates in synchronism with the step-by-step movement of a prewrapped package to securely attach a label to the prewrapped package as it moves through the transfer system.

A still further object of the present invention is to provide an improved label pick up and applying device which is fast in operation.

A still further object of the present invention is to provide a conveyor system that will positively locate a package in a predetermined position.

Another object of the present invention is to provide a label adhesive actuating and applying device that maintains the label in a horizontal position at all times.

Still another object of the present invention is to provide a fully automatic label printing and securing system wherein the packages will always have a uniform appearance after the labels have been applied to the package.

A still further object of the present invention is to provide a fully automatic label printing and securing system wherein the entire label is securely affixed to the package.

Still another object of the present invention is to provide an adaptor for a scale which will allow for the free motion of a soft film wrapped package across a scale.

In accomplishing these objects, a fully automatic system has been developed for picking up a label which has the weight and cost of a prewrapped package stamped thereon and deposits that label onto the package. The labels are provided with a heat-sensitive adhesive which is activated by the heat in the pick up pad so that on applying the label to the package, it will readily adhere thereto. When the label is applied to the package, sufficient pressure must be applied to the label to insure that the entire label is brought into engagement with the package. If the adhesive on the label has been activated, the label will adhere to the package and will not come loose during subsequent handling.

The label is picked up by a vacuum controlled tube which is rotated into engagement with the adhesive coated side of the label. The tube is then rotated to reverse the label and place it in a position where a heated pick up pad can move directly over the label on the tube. The hot pad drops into engagement with the label and the label is then held on the pad by a vacuum. The tube then moves away and the pad is moved to a position over the package and dropped into engagement with the package with sufficient pressure to assure that the label will adhere to the package. Once the label has been secured to the package the pad is returned to the starting position and the cycle is repeated.

To assure that the label is secured to the package, a freely rotating brush is mounted on the frame in alignment with the path of travel of the package as it is moved across the conveyor. Each bristle in the brush acts independent to hold the label in position on the package.

Other objects and advantages will become more readily apparent from the following detailed description when read in connection with the accompanying drawings, in which:

Figure 1:
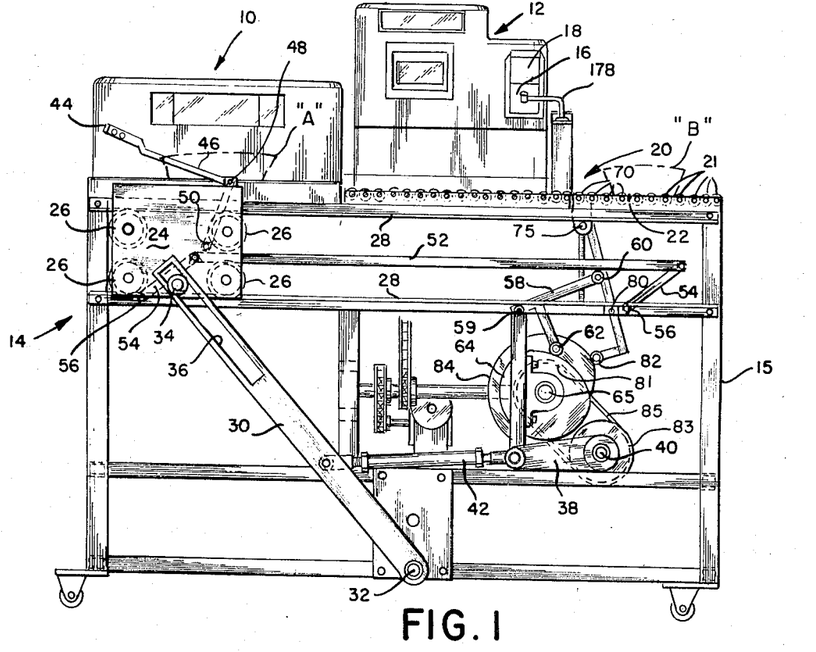
FIG. 1 is a front view of the fully automatic label printing and applying machine.

Referring to FIG. 1 of the drawings, the basic system for weighing the packages and printing the labels includes a scale 10, a label printing device 12 and a transferring system 14 mounted on a main frame 15. In the normal operation of these systems a prewrapped package A is placed on the scale and is moved from the scale to a position where the label is to be applied to the package. (Shown dotted at B in FIG. 1.) The weight of the package indicated at the scale is automatically recorded by the label printing device and the price of the weighed package is printed on a label 16 which is dropped into a slot 18 on the front of the label printing device. The scale and printing device are well known in this industry and do not form a part of the present invention other than supplying the printed label to a pick up position ready for application to the prewrapped package.

The packages are moved from the scale onto a conveyor 20 having a number of freely rotatable rollers 21. The end section 22 of the conveyor is connected to the rest of the conveyor by pins 75 so that it can be dropped from the horizontal plane as more specifically described below. The transferring system includes a transfer plate 24 which is supported by four wheels 26 on a pair of tracks 28 mounted on the side of the frame. The wheels are made of cast iron and ride on a composition material on the tracks to reduce noise. The plate is moved in a reciprocal motion by means of a lever arm 30 having one end pivotally connected to the frame by a pin 32. The other end of the lever arm is secured to the transfer plate by a pin 34 which is movable in slot 36 in the upper end of the lever arm. The lever arm is moved by means of a crank arm 38 mounted on the end of a shaft 40 and is connected to the lever arm by an adjustable link 42. The crank arm shaft is driven off of the main motor as described below.

The packages which are placed on the scale are moved onto the conveyor by a pusher bar 44 that is secured to one arm of a bell crank 46 which is pivotally mounted on the inside of the transfer plate by a pin 48. A cam roller 50 is secured to the other arm 46a of the bell crank and is positioned to ride on the top of a vertically movable track 52 which is secured to the frame by a pair of links 54 which are pivotable on pins 56. The track is moved vertically by means of a second bell crank 58 secured to the frame by pin 59 and having a cam roller 60 on one arm positioned to engage the lower portion of the track and a cam roller 62 secured to the other arm positioned to ride on the outer surface of a cam 64 secured to a shaft 65. This cam is also driven by the main motor as described below.

Figure 6:
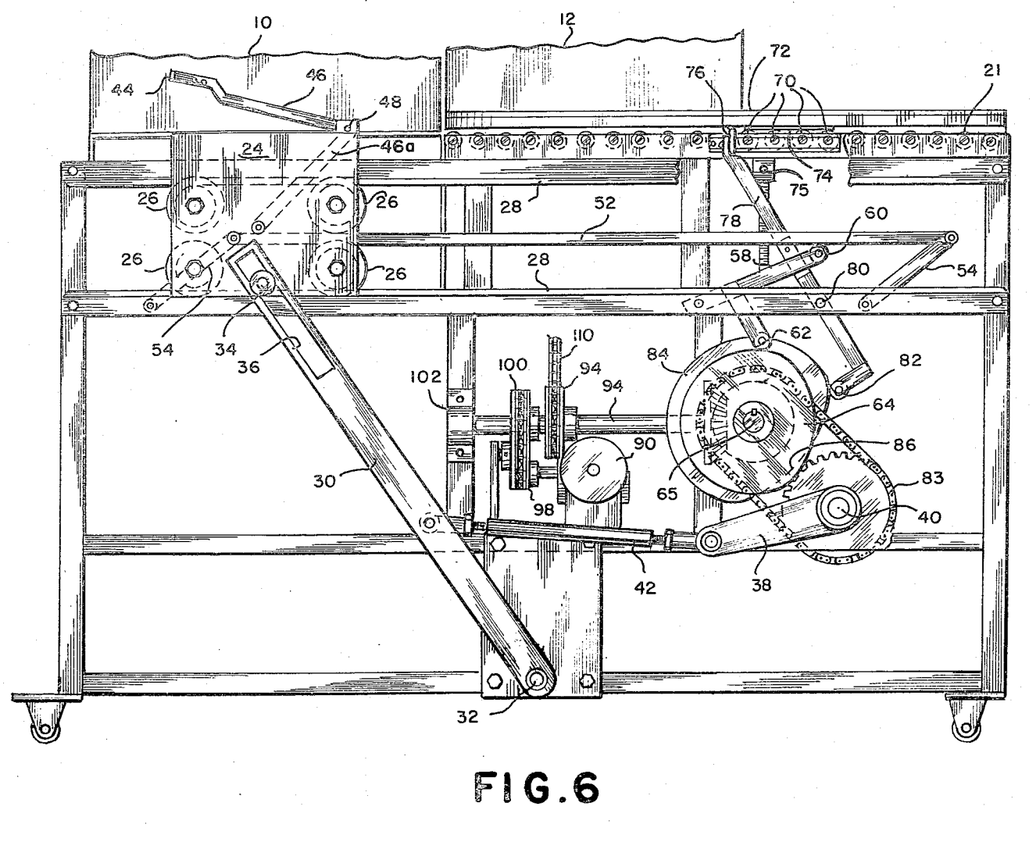
FIG. 6 is a front view of the conveying system.

When a package is to be moved from the scale and onto the conveyor the plate will be moved to the left end of the tracks as seen in FIG. 6. Cam roller 62 on the second bell crank will drop to the low cam surface on cam 64 allowing track 52 to drop to its lowermost position. Bell crank 46 for pusher bar 44 will also rotate to bring the pusher bar to a position immediately above the scale. As the plate moves to the right, the pusher bar will push the package onto the conveyor. When the plate reaches the end of its travel, the package normally will roll freely on rollers 21. In order to prevent this, the rollers marked 70 on the end section 72 of the conveyor are engaged by a braking surface 74 when section 22 is in the horizontal position. When the package engages these rollers it will stop approximately in a position where the labels can be applied to the package. In order to obtain a positive location of the package, a small pusher 76 is mounted on the end of arm 78 which is pivoted on pin 80 on the frame. A cam roller 82 is mounted on the other end of the arm and rides on the outer surface of cam 84 on shaft 65. A spring may be provided to hold this cam roller against the cam surface. The package will normally stop with its rear edge in front of this pusher. When the cam roller 82 drops onto cam surface 86 on the cam, the small pusher will rise above the upper surface of the rollers on the conveyor and will engage the rear edge of the package, pushing it forward a short distance. Since this pusher is used on all packages, the rear edge of the package will always be positively located at the point where the small pusher stops. This assures that the labels will always be affixed to the same position on each package and provides a uniform appearance to the packages.

The automatic label pick up and applying device which forms the basis of this invention is better understood if its functions are fully appreciated before describing all of its parts. After the label is dropped into slot 18 with its adhesive side facing outward, it must be first turned over so that the printing is on top. It is then picked up, heated to activate the adhesive and placed on the top of the package with sufficient pressure to assure that it will adhere to the package.

Figure 2:
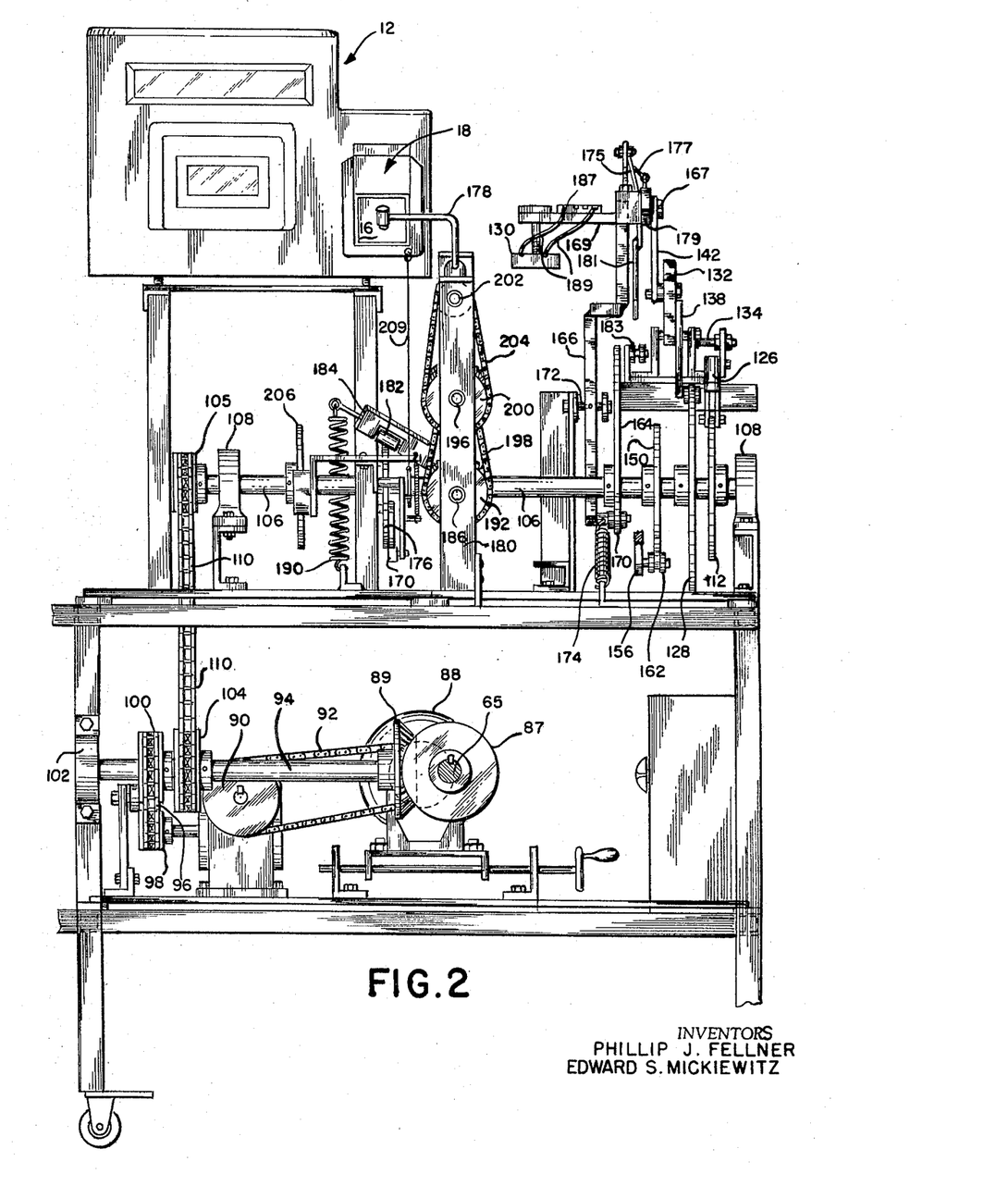
FIG. 2 is a front view of the label applying machine with the conveyor broken away to show the entire cam system.
Figure 3:
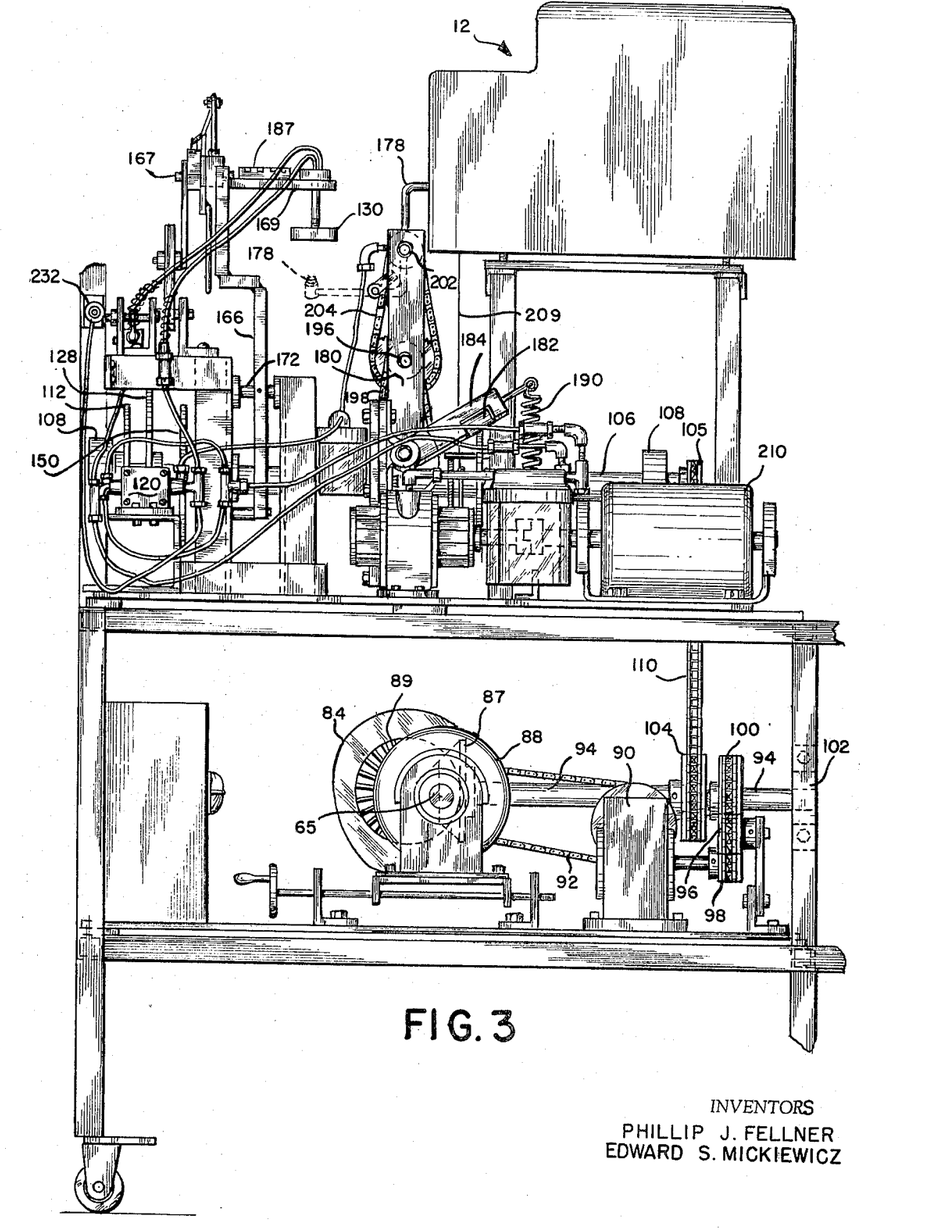
FIG. 3 is a rear view of the portion of the machine shown in FIG. 1.
Figure 4:
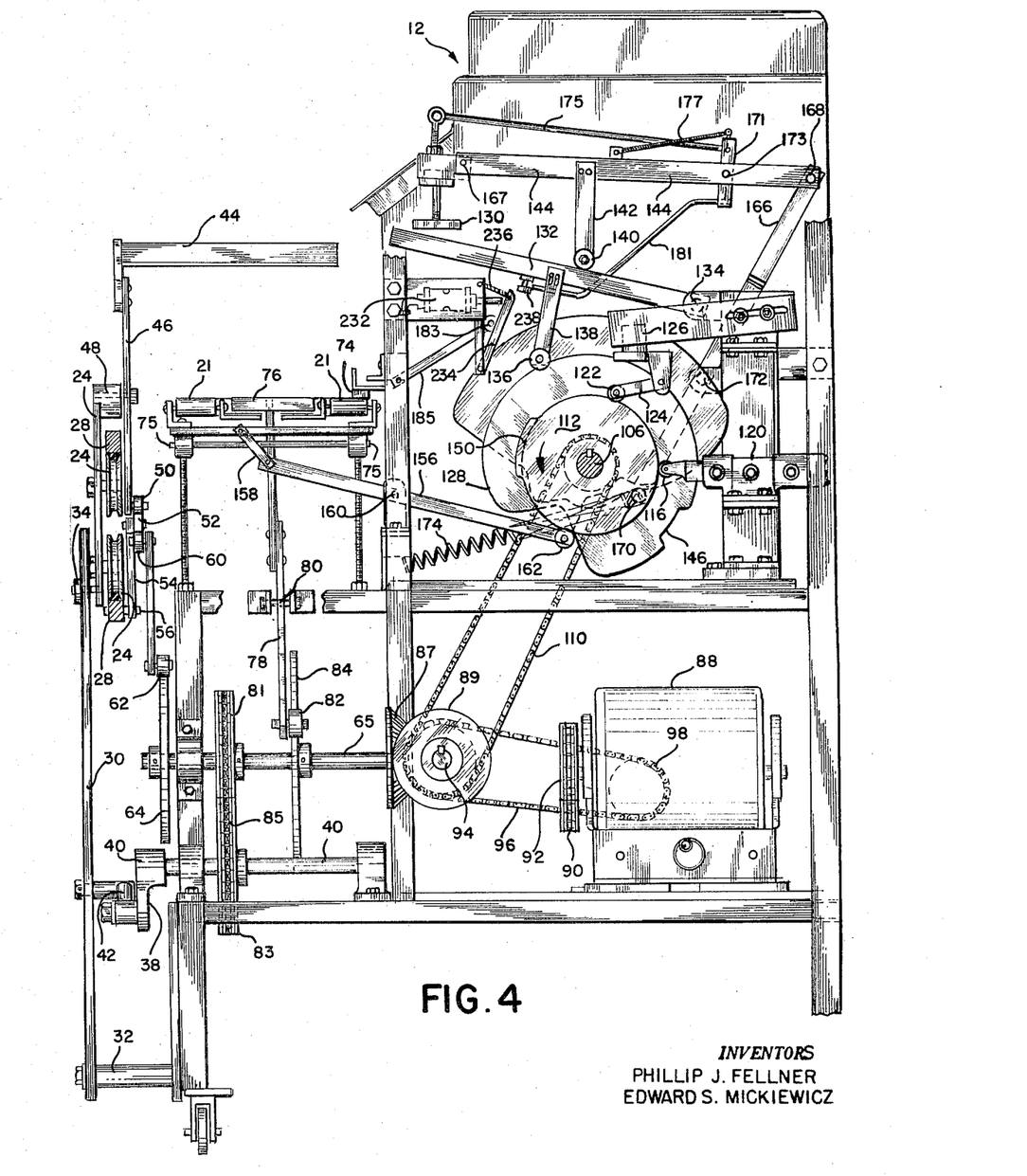
FIG. 4 is an end view of FIG. 1.

Referring now to FIGS. 2, 3 and 4 of the drawing, the operation of each of the cams required to perform these functions is specifically described. In FIG. 2 the roller type conveyor 20 has been broken away to more clearly show this cam system. The cams are driven by an electric motor 88 mounted on the bottom of the frame which drives a reduction gear 90 by means of a belt 92. The reduction gear is connected to drive shaft 94 by means of a chain 96 mounted on drive gear 98 and driven gear 100. The shaft is journalled in bearings 102 in the frame and has a drive gear 104 secured thereto. A cam shaft 106 journalled in bearings 108 is driven by a chain 110 mounted on gear 104 and a gear 105 on the cam shaft.

A bevel gear 89 is secured to the end of shaft 94 and is positioned to engage bevel gear 87 on shaft 65. The motion of shaft 65 is transferred to shaft 40 by chain 85 mounted on gears 83 and 81.

The first cam 112 on the right end of the cam shaft (FIGURES 2 and 7) has a single lobe 114 which is used to actuate the vacuum and pressure systems. Cam roller 116 mounted on control arm 118 is used to operate vacuum control valve 120. Cam roller 122 is mounted on the end of lever arm 124 and is used to control pressure control valve 126. Since the cam has only a single lobe its operation is obvious and will be completely described in the description of the pneumatic system.

The second cam 128 is used to control the vertical motion of label pick up pad 130. This is accomplished by means of an arm 132 having one end pivotally connected to the frame by pin 134. A cam roller 136 is secured to arm 138 which depends from arm 132 and is positioned to ride on the surface of cam 128. The top of the arm serves as a track for a roller 140 which is secured to arm 142 on pick up arm 144. When cam roller 136 drops into notch 146 or 148 on the surface of the cam, the pick up pad will also drop and will be raised up again when cam roller 136 moves out of the notches.

The third cam 150 is used to control the position of the end section 22 of the conveyor. This end section is connected to the rest of the conveyor by pins 75 so that it can be pivoted from a horizontal to a diagonal position to discharge a package after the label has been applied. A lever arm 156 is connected to the bottom of section 72 by link 158 and is pivotally secured to the frame by pin 160. A cam roller 162 is secured to the other end of the lever arm in a position to engage the surface of cam 150. The weight of the section is sufficient to keep the cam roller in engagement with the surface of the cam. The conveyor section must be pushed upward until rollers 70 engage surface 74 so that these rollers are prevented from rotating as previously described.

The fourth cam 164 is used to control the horizontal position of pick up pad 130. Pick up arm 144 is pivotally connected to one end of lever arm 166 by pin 168. A cam roller 170 is secured to the other end of arm 166 which is pivotally mounted on the frame by pin 172. The cam roller is held against the surface of cam 164 by tension spring 174 having one end secured to the frame and the other end secured to the lever arm. The pick up pad is moved back and forth horizontally by the motion of the lever arm as cam roller 170 follows the outer surface of the cam.

The pick up pad must be maintained in a horizontal position as it is brought into engagement with the top of the package in order to assure that the entire label is brought into engagement with the package. This is accomplished by mounting the pad on an arm 169 which is pivotally connected to the end of arm 144 by pin 167. A second lever arm 171 is pivotally connected to the other end of arm 144 by a pin 173 and is connected to an upstanding section on arm 169 by a link 175. Spring 177 is connected to the arm 171 and to arm 144 to bias the pad to a horizontal position against a limit stop 179. As the pick up arm is moved horizontally toward the package, a cam wire 181 which is secured to the lower end of arm 171 will engage a roller 183 on fixed arm 185 on the frame. When the arm moves in the horizontal direction it will also move in a vertical downward direction as cam roller 136 drops into the notches 146 and 148 in the second cam. The cam wire will ride on the roller holding the pad in the horizontal position until it engages the package.

The pick up pad is made of a solid block of metallic material and can be heated by any suitable system. Since such systems are conventional, a block 187 is shown connected to the pad by wire 189 to designate the heating system.

Figure 10:
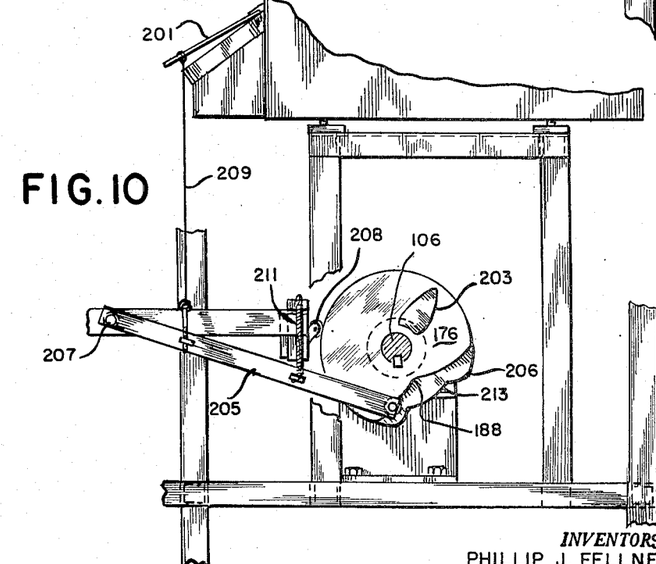
FIG. 10 is a side view of the fifth and sixth cams.

The fifth cam 176 is used to actuate pick up tube 178. It should be noted that the pick up tube is used to pick up labels from the slot on the label printing device. The tube is then rotated through 180° to a position in alignment with pick up pad 130. The tube is rotated by a series of gear and chain arrangements which are journalled in vertical frame members 180. A cam roller 182 in arm 184 is positioned to ride on the surface of cam 176. The other end of the arm is secured to shaft 186 so that the shaft will be reciprocated through a segment of a circle each time the roller drops into and out of notch 188 in the cam (FIG. 10). A tension spring 190 is used to hold the cam roller against the cam surface.

The motion of shaft 186 is picked up by gear 192 on the shaft and transferred to gear 194 on shaft 196 by chain 198. Gear 192 is larger than gear 194 so that a greater rotary motion is imparted to the second shaft. This motion is transferred to the tube which is journalled in the vertical members by gear 200 on the shaft to gear 202 on the tube by chain 204. Again the rotary motion of gear 202 will be greater than gear 200 with the gear ratios selected to provide 180° of rotation in the tube.

The label printing devices are normally provided with a label ejector 201 (FIG. 10) which must be depressed each time a label is to be ejected by the device. A cam lobe 203 is secured to the side of cam 176 and actuates a lever arm 205 which is pivotally connected to the frame by a pin 207. Arm 205 is connected to the ejector by a wire 209 to pull the ejector down each time the cam lobe 203 engages the lever arm. A spring 211 may be provided to hold arm 205 in the upper position. As will be more apparent hereinafter, this is timed to correspond to the motion of the pick up tube as it moves the label from the slot in the printing device.

The sixth cam 206 is used as a checking cam to stop the cycle of operation if the scale fails to record the weight of a package within a predetermined period of time. The electric circuit for the motor will be interrupted by a micro switch which is actuated by cam roller 208 each time the cam roller drops into notch 213. The scale is provided with an override switch that is closed when the package is finally weighed. Normally, the weighing of the package is practically instantaneous so that the scale switch would be closed when the label pick up and applying device starts a cycle. However, if the weighing of the package is not completed when the cycle is to start, the micro switch actuated by cam 206 will open the circuit to stop the motor until the scale switch closes.

Figure 5:
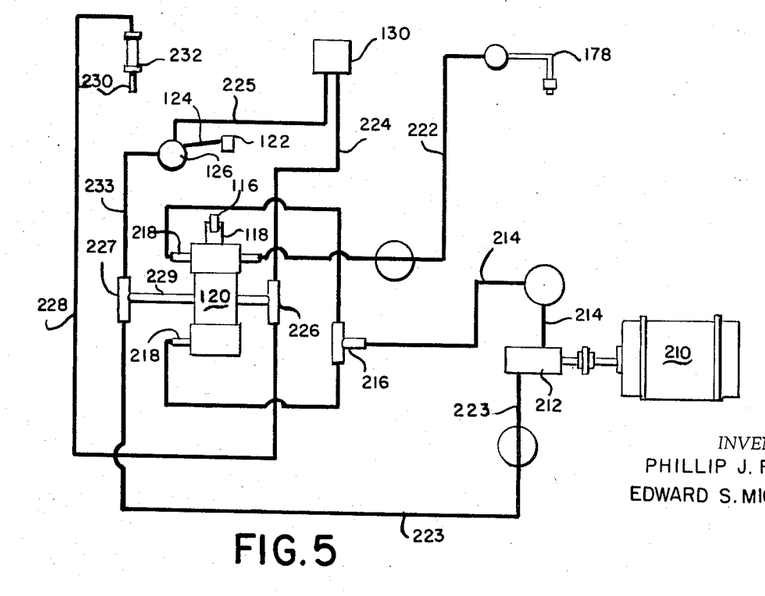
FIG. 5 is a schematic view of the pneumatic system.

The pneumatic system which is used to provide the vacuum and air pressure for the operation of the pick up tube and pick up pad is shown in FIG. 5. This system includes a motor 210 which is used to drive a pump 212. The vacuum line 214 to the pump is connected through a T connection 216 to the vacuum inlet connections 218 on control valve 120. The control valve is controlled by the cam roller 116 to either pull a vacuum through line 222 in the pick up tube 178 or through line 224 to pick up pad 130. The pick up pad has a central aperture which terminates on its lower surface so that the vacuum in the pad is applied directly to the label. An interlock system is connected to the pick up pad to prevent the vertical motion of the pad if it fails to pick up the label from the tube. The interlock is connected to T connection 226 by line 228 so that a vacuum will be pulled in the interlock whenever a label is picked up by the pad. When a vacuum is pulled, plunger 230 will be drawn into the housing 232, allowing lever arm 234 to be pulled by spring 236 away from limit stop 238 on arm 132. If the pad does not pick up a label, a vacuum will not be pulled in housing 232 and the plunger will hold the lever arm 234 in the outer position. When cam roller 136 is supposed to drop into the notch on the second cam, the limit stop 233 will engage the end of arm 234 preventing the downward motion of arm 132.

The air pressure line 223 from the pump 212 is connected to a T connection 227 having one line 229 connected to control valve 120 and the other line 233 connected to a second valve 126 which is controlled by cam roller 122 on arm 124. This valve is connected to the pick up pad by line 225 and is used to blow the label off of the pad after it has been brought into engagement with the package. A second air passage is provided in the pick up pad which terminates on its lower surface and is connected to line 225 so that the air pressure which is applied through line 225 is applied directly to the label.

As seen in FIG. 4 cam 112 rotates counterclockwise with cam lobe 114 engaging roller 116 first. During the time that roller 116 rides on the surface of the cam a vacuum will always be drawn in the pick up tube. When the cam roller 116 rolls up onto cam lobe 114, the vacuum in the tube will be cut off and a vacuum will be drawn in the pick up pad. As the cam roller rolls up on the lobe, a momentary positive pressure is applied to the tube through line 229 and line 222. This occurs in the transfer of the label from the tube to the pad and aids in making this transfer.

The operating cycle is started whenever a package is placed on the scale and weighed. Motors 88 and 210 normally run continuously. The package pushing system and label applying system will start simultaneously once the package has been weighed on the scale. Cam roller 62 will roll onto the smaller diameter surface of cam 64, allowing push rod 44 to drop onto the scale behind the package through the linkage action of bell cranks 58 and 46 and track 52. Crank arm 38 which is rotating clockwise in FIG. 6 will pull lever arm 30 clockwise, causing plate 24 to move across tracks 28 pushing the package onto rollers 21 of conveyor 20. Simultaneously with the commencement of this motion, tube 178 will be rotated into engagement with slot 18 in the label printing machine by the motion of arm 184 as cam roller 182 drops into notch 188 in cam 176. The label will drop into slot 18 of the label printing device prior to engagement by the pick up tube. The label ejectors 201 on the scale will be tripped by the engagement of cam lobe 203 with lever arm 205, forcing it downward against the bias of spring 213. The downward motion of arm 205 is transferred to the ejector by wire 209. Continuous rotary motion of cam 106 will rotate tube 118 back through 180° carrying the label to a position in alignment with pick up pad 130. The printed side of the label will now be on top and the adhesive side on the bottom. The label is picked up by the tube by a vacuum which is continuously drawn in the tube through line 222 from the control valve 120.

Figure 7:
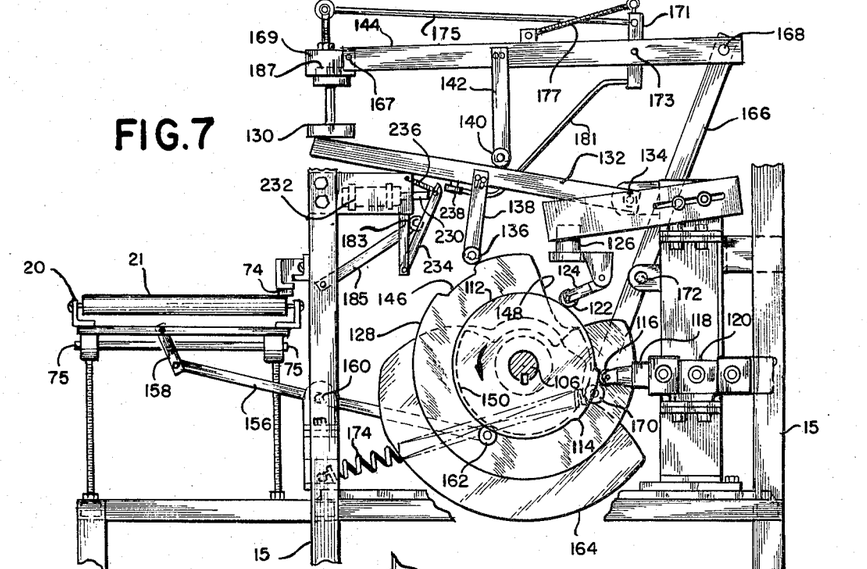
FIG. 7 is a side view of the device showing the position of the cams as a label is being transferred from the pick up tube to the pick up pad.

The pick up pad 130 is moved in a horizontal direction by cam 164 acting on cam roller 170 on lever arm 166 (FIG. 7). When cam roller 136 drops into notch 146 in cam 128, the pad will drop into engagement with the label which is held by the pick up tube. Simultaneously with this motion, cam lobe 114 will engage cam 116 on the control valve, reversing the pressure in the tube momentarily, thereby setting up a positive pressure in the tube to release the label to the pick up pad and a vacuum is drawn in line 224 which is connected to the pick up pad. The label will then be held against the lower surface of the pick up pad by the vacuum in line 224. When the vacuum is set up in line 224 a vacuum will also be drawn in line 228, pulling plunger 230 into the housing. This releases interlock lever arm 234 from under limit stop 238 so that the pad can be dropped into engagement with a package. In FIG. 7 it should be noted that the pick up pad has been lifted from the tube and is in position to be moved horizontally over a package. If a label is not picked up by the pickup pad, a vacuum will not be set up in line 228 and the interlock will not be actuated. Lever arm 234 will not move out from under limit stop 238 and the pad will not be dropped into engagement with the package.

Figure 8:
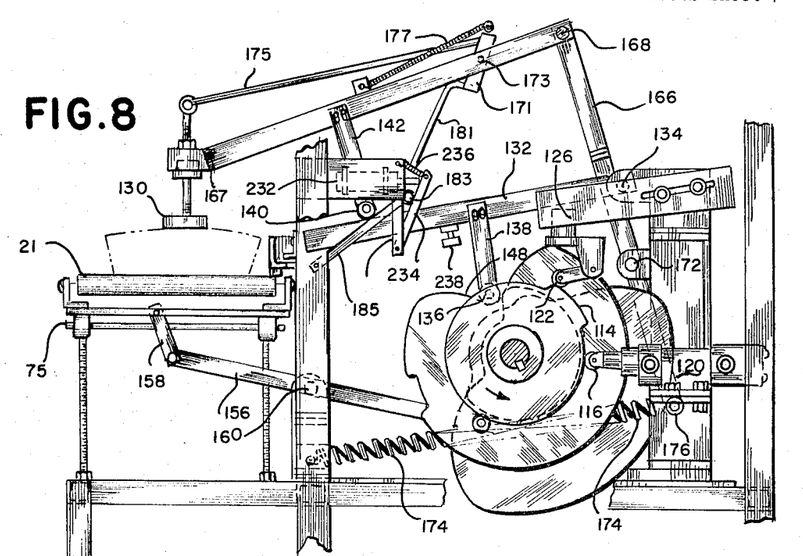
FIG. 8 is a side view similar to FIG. 7 with the pick up pad in position to apply the label to a package.
Figure 9:
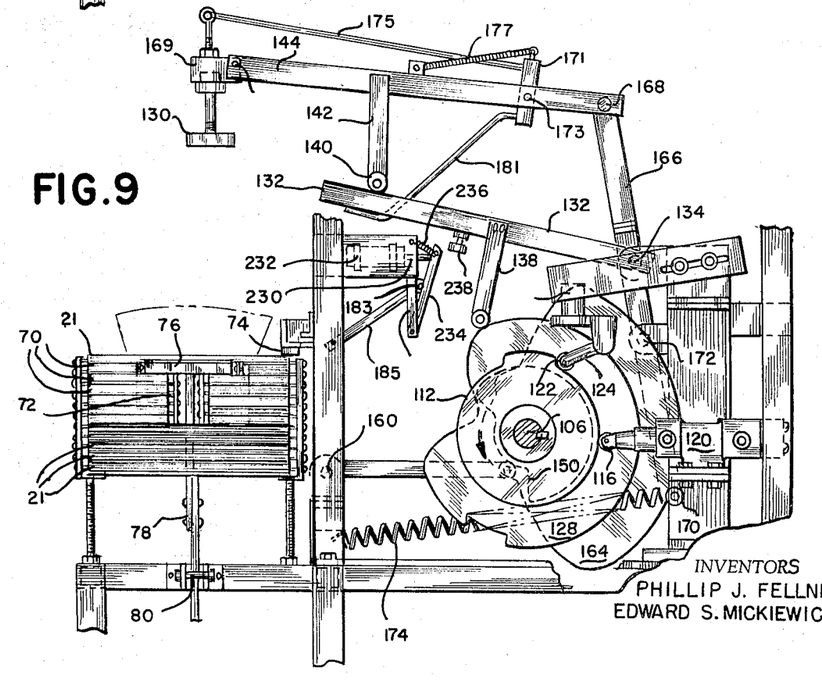
FIG. 9 is a view similar to FIG. 7 after the label has been applied to the package and the end section of the conveyor dropped allowing the package to fall into a container.

Cam roller 136 will roll up onto the outer cam surface of cam 128 lifting the label off of the pick up tube. The pick up pad will move horizontally over the conveyor where the package has been positively located by small pusher 76. As cam roller 136 drops into notch 148 in cam 128 (FIG. 8), cam wire 181 will engage roller 183 causing the wire to follow a predetermined path as arm 144 moves downward. The pick up pad will be maintained in a horizontal plane on the end of arm 144 by the action of lever arm 171 and link 175. When the pick up pad engages the package, the downward motion of arm 144 will stop and arm 132 will continue to move downward until cam roller 136 reaches the end of notch 148. When arm 132 has reached the end of its downward motion, lobe 114 will have moved out from under roller 128 and into engagement with cam roller 122. The vacuum in line 224 will be cut off and air pressure will build up in line 225 to the pick up pad. This air pressure will blow the label against the package as the pick up pad is moved away from the package. Since the pad is hot when it picks up the label, the adhesive on the label will be activated so that the label adheres to the package. Cam 128 will continue to rotate and cam 136 will ride up to the outer surface of the cam, lifting the pick up pad off of the package. As the pick up pad is moved away from the package, cam roller 162 will drop into the notch in cam 150, allowing the end section 72 of the conveyor to rotate to a diagonal position. The rollers 70 will be released from brake pad 74 and the weight of the package will cause the package to roll off of the conveyor.

During the time the pick up pad is completing its cycle, the cam roller 62 will ride on the outer surface of cam 74, pushing track 52 upward as well as rotating bell crank 46 about pivot 48 to raise the pusher bar to its upper position. Crank arm 38 will push link 42, rotating lever arm 30 back to a starting position and move the pressure arm back to the scale. The system will then be ready to start another cycle of operation.

Figure 11:
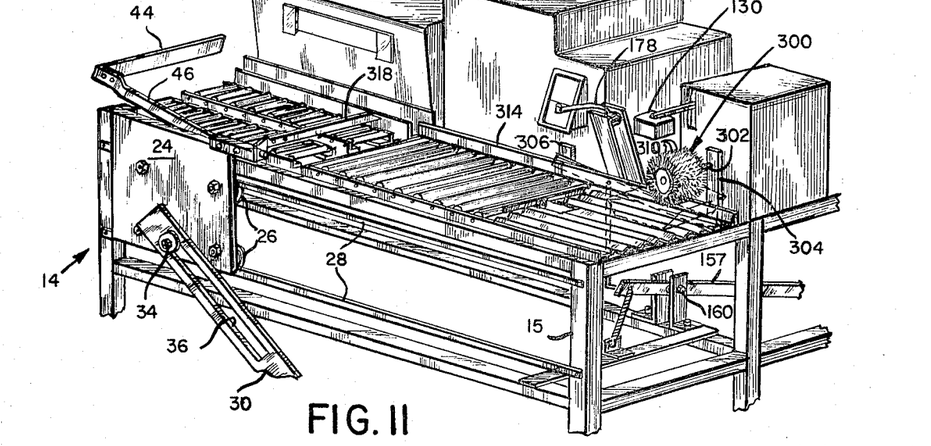
FIG. 11 is a front view of the frame with the brush positioned to engage the label.
Figure 12:
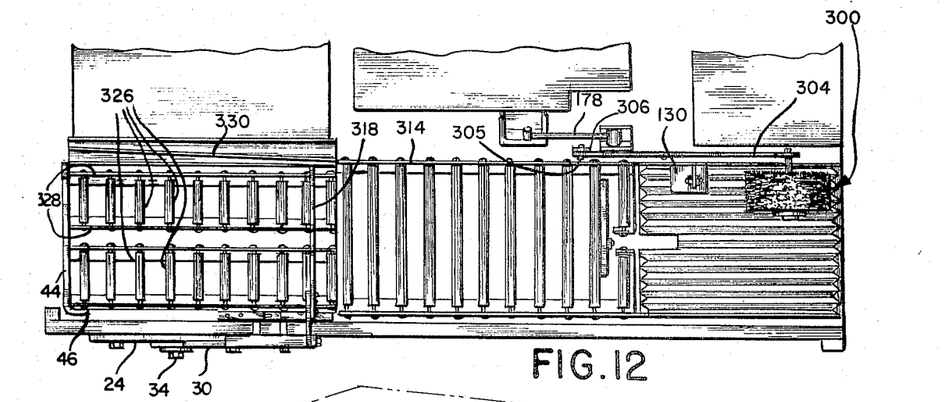
FIG. 12 is a top view of the conveyor showing the guide and brush location.

Referring to FIGS. 11 and 12, a modified arrangement of the present invention is shown wherein the labels after they have been secured to the packages are pressed against the package to achieve complete adherence of the label to the package. The apparatus shown is the same as shown in FIG. 1 through 5 and is numbered the same where the same parts are used. A wide rotary brush 300 is shown mounted to rotate freely on pin 302 on bracket 304. The bracket is pivotally connected to a vertical member 306 by a pin 305 to move the brush up and down with respect to the top of the table 308. The bracket is connected to the end of lever arm 157 by a connecting pin 310 and is pivoted about pin 160 by the action of a cam on a cam roller located on the end of the lever arm (similar to cam roller 162 acting on cam 150). A spring 312 is used to bias the lever arm to a down position. The brush is aligned with pick up pad 130 when the pick up pad is in fully extended position overhanging the package on the conveyor. Package guide plate 314 is located along the inside edge of the conveyor to align the packages with the pick up pad and the rotary brush as they are moved along the conveyor. The brush is dropped to its low position a short distance above the table to engage the packages as they are pushed across the table. The packages will rotate the brush as it is pushed past the brush so that the bristles 316 in the brush engage the entire surface of the label pressing it against the package. Since each bristle will act independently the entire surface of the label will be pressed against the surface of the package.

The packages are moved from the scale to the label applying position by pusher bar 44 mounted on bell crank 46. A second pusher 318 is pivotally mounted on transfer plate 24 to push the packages from the label applying position off of the conveyor. The second pusher bar is pivoted into the path of travel of the packages by the cam action of bell crank 46. As the package is moved under the brush, each bristle in the brush will press downward on the label so that the entire adhesive surface of the label is pressed against the wrapping paper on the package regardless of the shape of the wrapping paper on the top of the package. When the transfer plate reaches the end of its travel the two pusher bars will be pivoted upward out of the path of travel of the package by bell crank 46 and will be moved back to start the next cycle of operation.

Figure 13:
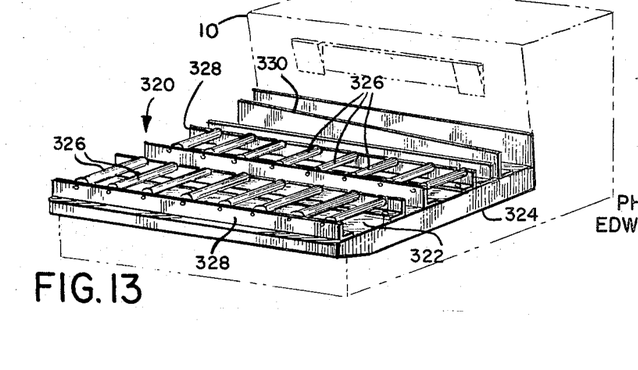
FIG. 13 is a perspective view of a scale adaptor used in the present invention.

In FIG. 13 a scale adaptor 320 is shown which is placed on the top of the weighing platform of the scale 10 in order to provide free motion of the packages as they are moved onto and off of the scale. The adaptor includes a base 322 having a flange 324 depending from its outer edge. The inner perimeter of the flange is shaped the same as the outer perimeter of the scale platform and is slightly larger to provide a snug fit when it is placed on the scale. A number of rollers 326 are secured to longitudinal side members 328 on the top of the base and rotate freely when a package is pushed across the top of the adaptor. A guide plate 330 is mounted along the back edge of the base to align the package with the longitudinal axis of the conveyor so the labels will be straight. Referring to FIG. 12 the guide plate 330 is shown aligned with package guide plate 314 to provide a continuous guide for the packages across the conveyor. The wrapped packages are fed onto the rollers on the adaptor from an indexer and ride freely across the rollers. The motion of the pusher bar 44 and the feeding of the packages onto the adaptor is synchronized so that if the oncoming package is traveling too fast when it is fed onto the adaptor, it will engage the back surface of pusher bar 44 as the pusher bar is moving off the scale to stop the oncoming package on the scale.

Although only one embodiment of the present invention has been shown and described it should be apparent that various changes and modifications can be made herein without departing from the scope of the appended claims.

What is claimed is:

1. The combination with an automatic scale and label printing machine for weighing and printing labels for prewrapped packages of means for automatically moving the package from the scale onto a conveyor and for picking up the printed labels from the printing machine and affixing them to the package after it is moved from the scale onto the conveyor, comprising; a roller conveyor on said scale for providing free movement of packages over said scale, said conveyor including a base, rollers mounted freely and undrivingly on said base for rotation about axes transverse to the direction of package movement and for supporting packages thereon, said rollers lying in a horizontal plane to prevent feeding thereof by gravity, and package guide means along one side of said conveyor to align packages along a predetermined line of travel;

transfer means for moving said prewrapped package over said roller conveyor and from the scale to a position on the conveyor for applying the label,     pick up means for removing the printed labels from the printing machine and holding them in a position to be placed on the package,     heat applying means for picking the label from the pick up means and placing it on the package, and     power means for actuating said transfer means, said pick up means and said applicator means in timed sequence with the position of said package.

2. The combination with a scale and label printing machine for weighing and printing labels for prewrapped packages, of means for moving said packages from the scale onto a conveyor and applying said labels to said packages, comprising; a roller conveyor on said scale for providing free movement of packages over said scale, said roller conveyor including a base, rollers mounted on said roller conveyor for free and undriven rotation about axes transverse to the direction of package movement and for supporting packages thereon, said rollers lying in a horizontal plane to prevent feeding thereof by gravity, and package guide means along one side of said roller conveyor to align packages along a predetermined line of travel;

a frame for supporting said scale and label printing machine,     a conveyor mounted on said frame in close proximity to said scale,     transporting means for moving said packages from said roller conveyor to a position on the conveyor in close proximity to the labeller,     means for moving the labels from the labeller to a pick up position to be applied to the packages, and     means for transferring the labels from the pick up position to the prewrapped package, said transferring means including heat means to activate the adhesive on said label prior to depositing the label on the package, said means for moving the labels from the labeller to the pick up position including a vacuum tube extending radially outward from a vertically swingably mounted tube which swings in a vertical plane through 180°, and a vacuum producing means, whereby on application of a vacuum through said tube a label can be picked up by the tube and on vertical swinging of the tube through 180° the label will be reversed to a position in line with the transferring means.

3. The combination according to claim 2 wherein said transferring means includes a horizontally movable arm and a pick up pad supported on said arm, said arm being movable on a vertically movable arm, said vacuum means being connected to draw a vacuum in said pick up pad when it is moved into engagement with said tube and for holding the label on the pick up pad until it is deposited on the package.

4. The combination according to claim 3 including an air pressure system operatively connected to said pick up pad for blowing said labels against said package for positive release of said label when the pad is moved away from the package.

5. The combination according to claim 3 wherein said pick up pad is pivotally mounted on said arm and a roller and linkage means is used to hold said pad in a horizontal position in the movement of the pad from the pick up tube to the package.

6. The combination according to claim 3 including an interlocking means for preventing downward motion of said pad when a label is not picked up from the vacuum tube, said interlocking means being activated by the vacuum line to the pick up pad.

7. The combination with a scale and label printing machine for weighing and printing heat activated labels for prewrapped packages,     of means for moving said packages from the scale and applying a label to each package after it has been weighed on the scale, comprising; a roller conveyor on said scale for providing free movement of packages over said scale, said roller conveyor including a base, rollers mounted on said roller conveyor for free and undriven rotation about axes transverse to the direction of package movement and for supporting packages thereon, said rollers lying in a horizontal plane to prevent feeding thereof by gravity, and package guide means along one side of said roller conveyor to align packages along a predetermined line of travel;

a frame for supporting a scale and a label printing machine,     a second roller conveyor positioned next to the scale and extending past the label printing machine,     transporting means for moving packages in steps from the first roller conveyor to a first position on the second roller conveyor in front of the label printing machine and from the first position off of the end of the conveyor,     vacuum means for moving labels from the label printing machine to a pick up position prior to being applied to the package,     heating generating pick up means for transferring the labels from the pick up position to the prewrapped packages and for activating the adhesive on the labels, and     means positioned adjacent to the second roller conveyor for applying pressure to the entire surface of the label as it is moved from the first position off the end of the conveyor.

8. A roller conveyor adaptor for a weighing scale to permit free movement of a package over the scale, comprising; a base, means for securing said base on said scale, rollers mounted freely and undrivingly on said base for rotation about axes transverse to the direction of package movement and for supporting packages thereon, said rollers lying in a horizontal plane to prevent feeding thereof by gravity, and package guide means along one side of said base to align packages along a predetermined line of travel.

9. The adaptor as recited in claim 8 further characterized in that said means for securing said base on said scale includes a downwardly extending flange on said base for detachable engagement with said scale.

10. The combination with an automatic scale and label printing machine for weighing and printing labels for prewrapped packages of means for automatically moving the package from the scale onto a conveyor and for picking up the printed labels from the printing machine and affixing them to the package after it is moved from the scale onto the conveyor, comprising: a roller conveyor on said scale for providing free movement of packages over said scale, said conveyor including a base, rollers mounted freely and undrivingly on said base for rotating about axes transverse to the direction of package movement and for supporting packages thereon, said rollers lying in a horizontal plane to prevent feeding thereof by gravity, and package guide means along one side of said base to align packages along a predetermined line of travel; transfer means for moving said prewrapped packages over said roller conveyor and from the scale to a position on the conveyor for applying the label, label pick-up and applying means for removing a printed label from the printing machine, applying heat thereto and applying said label to the package, and power means for actuating said transfer means and said label pick-up and applying means in timed sequence with the position of said package.

References Cited

UNITED STATES PATENTS

| | | | |
|---|---|---|---|
| 1,315,737 | 9/1919 | Milmoe | 156—571 |
| 2,323,023 | 6/1943 | Flanagan et al. | 177—52 X |
| 2,878,953 | 3/1959 | Mitchell | 156—566 X |
| 3,180,475 | 4/1965 | Del Rosso | 117—119 X |
| 3,194,710 | 7/1965 | Stremke. | |
| 3,264,161 | 8/1966 | Stremke et al. | |
| 3,284,271 | 11/1966 | Parks | 156—566 |
| 3,299,975 | 1/1967 | Stambera et al. | 177—52 |

EARL M. BERGERT, *Primary Examiner.*

T. R. SAVOIE, *Assistant Examiner.*